United States Patent [19]
Hatate et al.

[11] Patent Number: 5,646,459
[45] Date of Patent: Jul. 8, 1997

[54] INTEGRATED MAINTENANCE BYPASS SWITCH AND METHOD OF OPERATION THEREOF

[75] Inventors: Andrew K. Hatate, Dallas; Franklin F. Makan, Rockwall, both of Tex.

[73] Assignee: Lucent Technologies Inc., Murray Hill, N.J.

[21] Appl. No.: 556,445

[22] Filed: Nov. 9, 1995

[51] Int. Cl.$^6$ ........................................ H02J 1/00
[52] U.S. Cl. .......................... 307/85; 307/64; 307/65; 307/66; 307/45; 307/46; 307/82; 307/86; 307/87
[58] Field of Search ........................ 307/64, 65, 66, 307/45, 46, 82, 85, 86, 87

[56] References Cited

U.S. PATENT DOCUMENTS

| | | | |
|---|---|---|---|
| 5,081,367 | 1/1992 | Smith et al. | 307/64 |
| 5,376,828 | 12/1994 | Kim et al. | 307/64 |

*Primary Examiner*—William M. Shoop, Jr.
*Assistant Examiner*—Kim Lockett

[57] ABSTRACT

In a backup power system capable of deriving power from alternate AC primary and DC backup power sources to provide continuous AC power to an AC load and including an inverter/switch module having DC and AC inputs and an AC output, a maintenance bypass switch for, and method of decoupling the AC primary and DC backup power sources from the backup power module to allow maintenance to be performed thereon. The maintenance bypass switch includes a selector switch configured to function in alternate normal, standby bypass and maintenance bypass modes of operation, wherein: (a) in transitioning from the normal mode to the standby bypass mode, the selector switch decouples an inverter in the inverter/switch module from the DC backup power source, (b) in transitioning from the standby bypass mode to the maintenance bypass mode, the selector switch further couples the AC primary power source directly to the AC load and (c) in the maintenance bypass mode, the selector switch decouples the AC primary power source from the AC input of the inverter/switch module, the DC backup power source from the DC input of the inverter/switch module and the AC output of the inverter/switch module to the AC load, the maintenance bypass switch providing the continuous AC power to the AC load throughout the transitioning.

20 Claims, 4 Drawing Sheets

INTEGRATED MAINTENANCE BYPASS SWITCH AND METHOD OF OPERATION THEREOF

TECHNICAL FIELD OF THE INVENTION

The present invention is directed, in general, to power systems and, more particularly, to a maintenance bypass switch that provides single-switch isolation of power in a bypass mode.

BACKGROUND OF THE INVENTION

It is customary to have an alternate power source for an installation if a primary, commercial power source is lost or becomes unreliable. The alternate power source may take the form of, for example, a generator driven by an internal combustion engine. When a transformation from the commercial power source to the alternate source is required, a transfer switch is used to disconnect the commercial power source and thereafter to connect the alternate power source to the load. The transfer switch conventionally provides an open, or break-before-make, transition between the two power sources. More specifically, the transfer switch disconnects the initial commercial power source before connecting the alternate power source to the load. The open transition switching avoids any potential surges that may occur as a result of the two unsynchronized sources applying power to the load simultaneously.

Open transition transfer switches to accommodate the precise application as described above are well known in the art. For instance, transfer switches utilizing a pair of circuit breakers and a mechanism for operating the two circuit breakers in opposition are a product of former patents. U.S. Pat. No. 3,778,633 to DeVisser, et al., issued on Dec. 11, 1973, entitled "Automatic Electric Power Source Transfer Apparatus," discloses a device that includes two circuit breakers mounted end-to-end and operated in opposition by a ganging member driven rectilinearly by a screw shaft engaging a traveling nut connected to the ganging member. Another transfer switch of this type uses two side-by-side circuit breakers with handles. The handles are engaged by clevises attached to a lever arm that is rotated about a pivot axis between the two circuit breakers. In still another transfer switch using two side-by-side circuit breakers, a plurality of slides engaging the circuit breaker handles are driven in opposition by gears having an eccentric pin to engage a camming surface on the slide.

The previously-described transfer switches provide open transition operation and thus momentarily interrupt power to the load. However, the open transition switch, where there is absolute and unabridged interruption of power to the load for a period of time, is unacceptable in certain situations. For example, a digital computer will lose the contents of its volatile memory if the power source is severed for even a very short interval. In yet another example, a central office with equipment serving a telephone network cannot be deprived of power for even an instant, or service is lost throughout the network.

To accommodate such critical applications, uninterruptible power supplies ("UPSs") have been developed to provide continuous power to the computer or central office equipment should the commercial power source be lost. One illustration of an uninterruptible power supply is a battery that is ordinarily charged by a charging device connected to the commercial power system. When commercial power source is lost, the battery provides direct current ("DC") power to the load and an inverter coupled to and fed by the battery provides alternating current ("AC") power to the load. Conventionally, a special static switch, located in proximity to the inverter, provides a rapid open transfer between the commercial power source and the inverter. The resulting interruption of power only lasts for a few milliseconds, thereby preserving the integrity of the power to the load and not adversely affecting the digital computer, central office equipment or other critical load.

Occasionally, the uninterruptible power supply, including the inverter, must be removed from the power system to perform routine maintenance, for example. In such cases, a bypassing mechanism should be provided that is capable of disengaging the uninterruptible power supply from the power system without provoking an interruption of the power to the load. Prior art bypass switches, such as U.S. Pat. No. 5,081,367 to Smith, et al., issued on Jan. 14, 1992, and entitled "Electric Power System with Maintenance Bypass for Uninterruptible Power Supply Using Closed Transition Operation," disclose maintenance bypass switches for disconnecting an interruptable power supply.

The maintenance bypass switch of Smith, et al. provides a first switch in series with the uninterruptible power supply and a second switch that shunts the uninterruptible power supply and the first switch. The first and second switches are circuit breakers having handles which toggle between open and closed positions. The maintenance bypass switch includes an operator that operates the two circuit breakers in opposition with a closed transition so that one switch is always closed. An interlock prevents operation of the maintenance bypass switch when the alternate power source of the uninterruptible power supply is selected by the static transfer switch. An isolation switch between the uninterruptible power supply and the commercial power source and also shunted by the second switch of the maintenance bypass switch is open together with the first switch of the maintenance bypass switch when the uninterruptible power supply is to be isolated for maintenance. However, the prior art bypass switches, including Smith, et al., are deficient in some significant respects.

First, the prior art bypass switches only provide single line switching; even in the bypass mode of operation, a current always flows through an unswitched neutral line. Therefore, a person servicing an uninterruptible power supply coupled to the prior art bypass switches risk injury if the neutral line carries an electrical current.

Second, the transfer and restore procedures of the prior art bypass switches are cumbersome and unforgiving. To enter the bypass mode of operation, a user must meticulously follow the transfer sequence instructions. This involves simultaneously switching both the maintenance bypass switch (for AC bypass) and a separate inverter selector switch (for DC disconnect). If the user does not toggle the switches precisely at the same time, the bypass mode will not be achieved successfully leading to a situation where the two sources may be paralleled for an extended period of time or, worse yet, the load will decouple from the power source. Again, in the critical applications for which the uninterruptible power supply is designed, loss of power for even an instant is unacceptable.

Third, while Smith, et al. addresses some of the aforementioned deficiencies, Smith, et al. still does not provide a means for switching the DC source (i.e. battery) which may be hazardous depending on the voltage and charge capacity of the battery. Finally, Smith, et al. does not provide AC isolation between the uninterruptible power supply and the commercial power source in a single operation.

Accordingly, what is needed in the art is a maintenance bypass switch that provides more reliable isolation of both AC and DC power and simplifies entry into the bypass mode of operation by integrating the switching of both AC and DC power into a single maintenance bypass switch operable by a single selector.

SUMMARY OF THE INVENTION

To address the above-discussed deficiencies of the prior art, it is a primary object of the present invention to provide, in a backup power system capable of deriving power from alternate AC primary (often commercial) and DC backup (often battery) power sources to provide continuous AC power to an AC load and including an inverter/switch module having DC and AC inputs and an AC output, a maintenance bypass switch for, and method of decoupling the AC primary and DC backup power sources from the backup power module to allow maintenance to be performed thereon.

The maintenance bypass switch includes a selector switch configured to function in alternate normal, standby bypass and maintenance bypass modes of operation, wherein, in the normal mode, the selector switch couples the AC primary power source to the AC input of the inverter/switch module, the DC backup power source to the DC input of the inverter/switch module and the AC output of the inverter/switch module to the AC load. In transitioning from the normal mode to the standby bypass mode, the selector switch decouples an inverter in the inverter/switch module from the DC backup power source. In transitioning from the standby bypass mode to the maintenance bypass mode, the selector switch further couples the AC primary power source directly to the AC load. In the maintenance bypass mode, the selector switch decouples the AC primary power source from the AC input of the inverter/switch module, the DC backup power source from the DC input of the inverter/switch module and the AC output of the inverter/switch module to the AC load, the maintenance bypass switch providing the continuous AC power to the AC load throughout the transitioning. Therefore, the present invention introduces a maintenance bypass switch that integrates AC and DC switch functions, allowing single-switch activation of the maintenance bypass mode.

In a preferred embodiment of the present invention, the selector switch selectively couples and decouples both phase and neutral conductors of the AC primary and DC backup power sources. By also switching the neutral conductors, complete isolation of the module from the AC primary and DC backup power sources is possible.

In a preferred embodiment of the present invention, the maintenance bypass switch further comprises a status indicator coupled to the selector switch for indicating the mode of the selector switch. Although not necessary, the status indicator preferably presents information concerning the mode of the selector switch to a user. The status indicator may be near or remote from the selector switch.

In a preferred embodiment of the present invention, the maintenance bypass switch further comprises an alarm circuit coupled to the selector switch for transmitting a signal to an external alarm when the AC primary and DC backup power sources are disconnected from the AC load. Although not necessary, the alarm circuit allows a warning signal to be given to a user via the external alarm. The external alarm may be near or remote from the selector switch.

In a preferred embodiment of the present invention, the inverter/switch module comprises a static transfer switch. Those of ordinary skill in the pertinent art realize that static transfer switches accomplish fast source switching and are thus commonly employed in uninterruptible power supplies.

In a preferred embodiment of the present invention, the selector switch comprises a rotary cam switch. Alternatively, the selector switch may contain one or more interlocked switches.

In a preferred embodiment of the present invention, the selector switch causes a breaker within the inverter/switch module to trip, thereby decoupling the inverter from the DC backup power source. In a related, preferred embodiment of the present invention, in transitioning the selector switch from the maintenance bypass mode to the normal mode, the DC breaker remains tripped, the DC breaker capable of being reset separately to recouple the inverter to the DC backup power source. The DC breaker is often included as a portion of the inverter/switch module and affords additional protection to the inverter.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
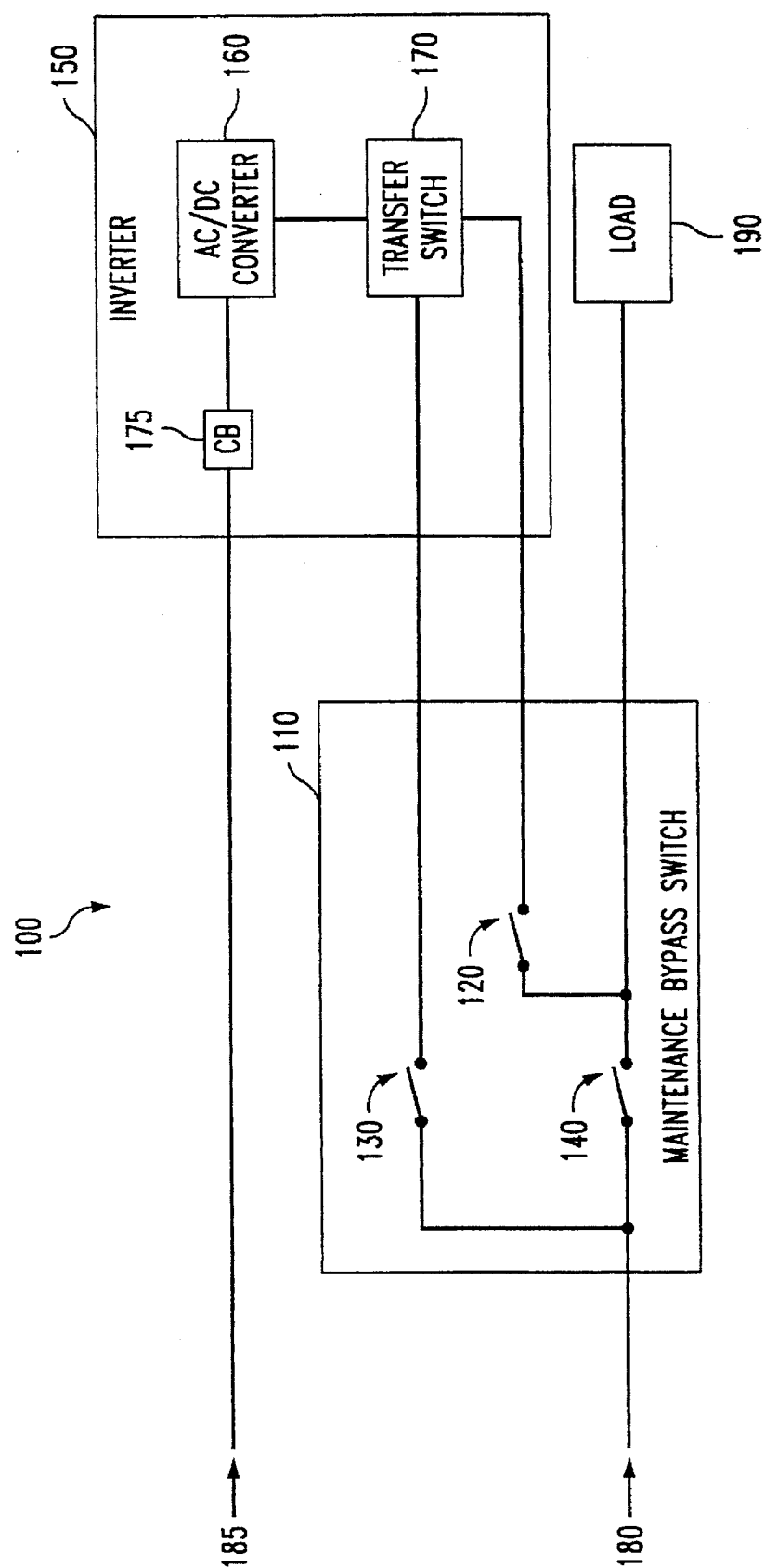
FIG. 1 illustrates a block diagram of a power system employing a prior art maintenance bypass switch.

Referring initially to FIG. 1, illustrated is a block diagram of a power system 100 employing a prior art maintenance bypass switch 110. The maintenance bypass switch 110 contains a first, second and third circuit breaker or switches 120, 130, 140, respectively. The power system 100 also includes an inverter 150 having a DC/AC converter 160, a static transfer switch ("STS") 170 and a circuit breaker 175. The DC/AC converter 160 converts direct current to alternating current and the STS 170 provides fast source switching in the inverter 150. An AC primary power source 180 is connected through the maintenance bypass switch 110 to the inverter 150 and a load 190. A DC backup power source 185 is connected through the inverter 150 and, after transformation to AC, through the maintenance bypass switch 110 to the load 190.

In the illustrated embodiment, the maintenance bypass switch 110 is presented with the first and second circuit breakers 120, 130 closed and the third circuit breaker 140 open. The AC primary power source 180, therefore, traverses both the maintenance bypass switch 110 (through the first and second circuit breakers 120, 130) and the inverter 150 (through the STS 170) en route to the load 190. The DC backup power source 185 traverses the inverter 150 (through the circuit breaker 175, the DC/AC converter 160 and the STS 170) and, after transformation to AC, traverses the maintenance bypass switch 110 (through the first circuit breaker 120) en route to the load 190.

To effectively bypass the inverter 150, the following procedures must be strictly adhered to. First, operate a switch on a panel (not shown) of the inverter 150 to a line position to connect the AC primary power source 180 to the load 190 through the second circuit breaker 130, the STS 170 and the first circuit breaker 120, consecutively. Second, close the third circuit breaker 140 through a lever on a panel (not shown) of the maintenance bypass switch 110 to provide a direct connection for the AC primary power source 180 to the load 190. Third, close the first circuit breaker 120 through a lever on the panel of the maintenance bypass switch 110 to disconnect the path established in the first step above. Fourth, disengage the circuit breaker 175 by physically opening the circuit breaker 175 inside the chassis (not shown) of the inverter 150 to disconnect the DC backup power source 185 from the inverter 150. Finally, open the second circuit breaker 130 through a lever on the panel of the maintenance bypass switch 110 to disconnect the AC primary power source 180 from the inverter 150. Thus, in the bypass mode of operation, the second circuit breaker 130 is open and the third circuit breaker 140 is closed providing a direct path for the AC primary power source 180 to the load 190 thereby bypassing the inverter 150.

To restore the inverter 150 operation the procedure is equally as cumbersome. First, close the circuit breaker 175 inside the inverter 150 to apply the DC backup power source 185 to the inverter 150. Second, close the second circuit breaker 130 through the lever on the panel of the maintenance bypass switch 110 to connect the AC primary power source 180 to the inverter 150. Third, rotate the switch on the panel of the inverter 150 to a line position. Fourth, close the first circuit breaker 120 through the lever on the panel of the maintenance bypass switch 110 to connect the inverter 150 to the load 190. Finally, open the third circuit breaker 140 through the lever on the panel of the maintenance bypass switch 110 to break the direct connection between the AC primary power source 180 and the load 190.

As previously discussed, the prior art maintenance bypass switch 110 endures several disadvantages. First, the transfer (or bypass) and restore procedures are cumbersome, confusing and unforgiving. To enter the bypass mode of operation, a user must meticulously follow the transfer sequence instructions. Moreover, the bypass mode of operation is potentially unsafe for maintenance. The prior art maintenance bypass switch 110 only provides single line switching; even in the bypass mode of operation, a current always flows through an unswitched neutral line. Therefore, a person servicing the inverter 150 coupled to the maintenance bypass switch 110 risks injury if the neutral line carries an electrical current. Also, the prior art maintenance bypass switch 110 presents additional risks by requiring separate AC primary power source 180 connect and disconnect switching.

Figure 2:
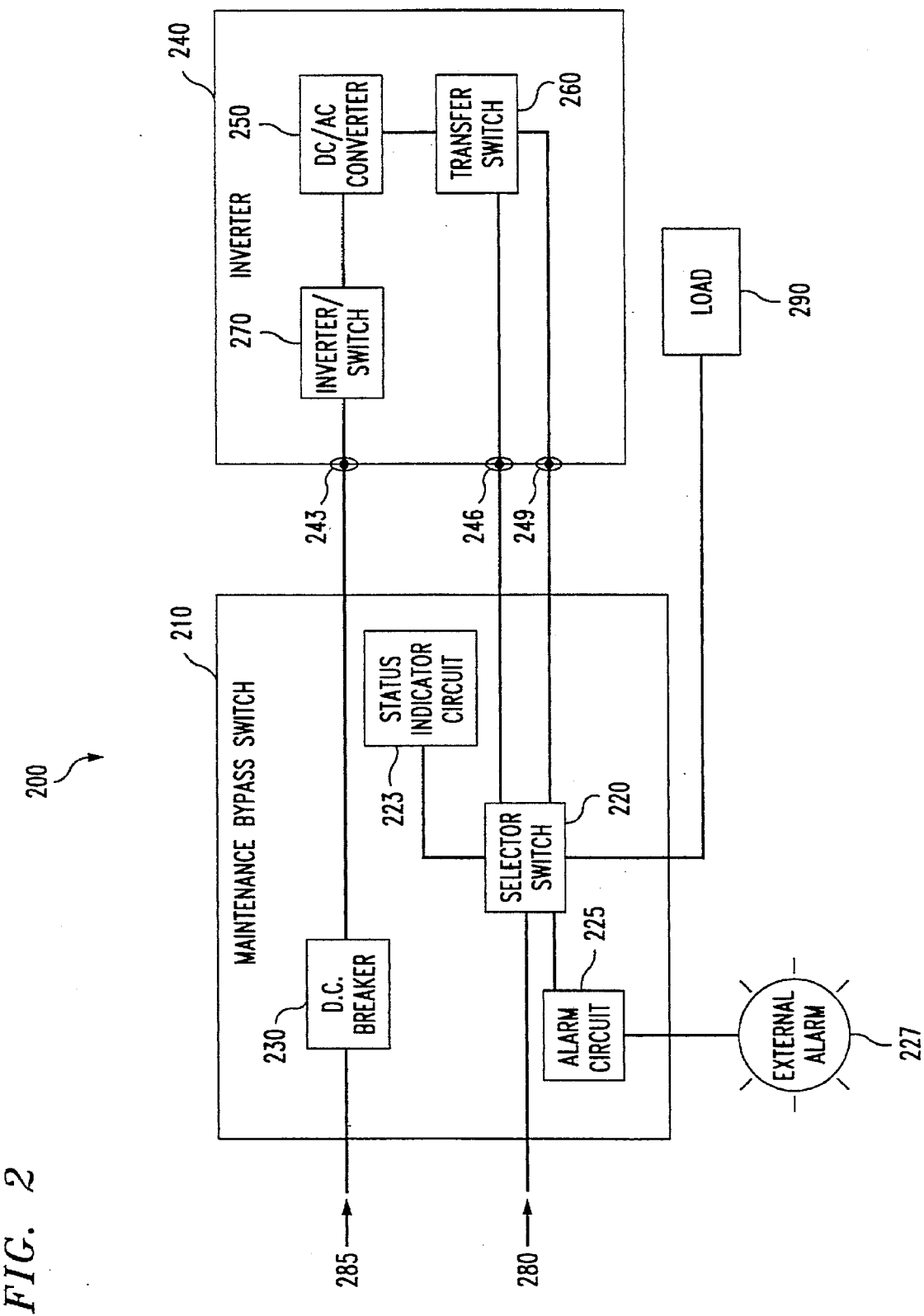
FIG. 2 illustrates a block diagram of a power system employing an embodiment of a maintenance bypass switch according to the principles of the present invention.

Turning now to FIG. 2, illustrated is a block diagram of a power system 200 employing an embodiment of a maintenance bypass switch 210 according to the principles of the present invention. The maintenance bypass switch 210 includes a selector switch 220, a status indicator circuit 223, an alarm circuit 225 and a DC breaker 230. While the selector switch 220, in the illustrated embodiment, comprises a multi-connection rotary cam switch, alternatively, the selector switch may contain one or more interlocked conventional switches. The power system 200 also includes an inverter/switch module 240 (i.e. backup power module) having a DC/AC converter 250, a static transfer switch ("STS") 260 and a circuit breaker (an inverter/switch module DC breaker) 270. The DC/AC converter 250 converts direct current to alternating current and the STS 260 provides fast source switching in the inverter/switch module 240. An AC primary power source 280 is connected through the maintenance bypass switch 210 to the inverter/switch module 240 and a load (i.e. an AC load) 290. A DC backup power source 285 is also connected through the maintenance bypass switch 210 to the inverter/switch module 240 and, after transformation to AC, to the load 290.

The power system 200 derives power from the alternate AC primary power source 280 (often commercial) and the DC backup power source 285 (often battery) to provide continuous AC power to the load 290 and the inverter/switch module 240 having DC and AC inputs 243, 246 and an AC output 249. The maintenance bypass switch 210 decouples the AC primary power source 280 and the DC backup power source 285 from the inverter/switch module 240 (or other backup power module) to allow maintenance to be performed thereon. The maintenance bypass switch 210 is, therefore, capable of decoupling single- or multi-phase power sources from the inverter/switch module 240.

The selector switch 220 of the maintenance bypass switch 210 functions in one of several modes including an alternate normal ("NORM"), a standby bypass ("SBP") and a maintenance bypass ("MBP") mode of operation. In the normal mode, the selector switch 220 couples the AC primary power source 280 to the AC input 246 of the inverter/switch module 240, the DC backup power source 285 to the DC input 243 of the inverter/switch module 240 and the AC output 249 of the inverter/switch module 240 to the load 290. In transitioning from the normal mode to the standby bypass mode, the selector switch 220 decouples the inverter/switch module 240 from the DC backup power source 285. In transitioning from the standby bypass mode to the maintenance bypass mode, the selector switch 220 further couples the AC primary power source 280 directly to the load 290. In the maintenance bypass mode, the selector switch 220 decouples the AC primary power source 280 from the AC input 246 of the inverter/switch module 240, the DC backup power source 285 from the DC input 243 of the inverter/switch module 240 and the AC output 249 of the inverter/switch module 240 to the load 290. The maintenance bypass switch 210 provides continuous AC power to the load 290 throughout the transitioning. Therefore, the present invention introduces a maintenance bypass switch 220 that integrates AC and DC switch functions, allowing single-switch activation of the maintenance bypass mode.

Additionally, in transitioning from the maintenance bypass mode to the normal mode, the DC breaker 230 remains tripped. The DC breaker 230 is capable of being reset separately to recouple the inverter/switch module 240 to the DC backup power source 285. The DC breaker 230 may also be included as a portion of the inverter/switch module 240 (as discussed below) and affords additional protection to the inverter/switch module 240.

The selector switch 220 also selectively couples and decouples both phase and neutral conductors of the AC primary and DC backup power sources 280, 285. Switching the neutral conductors provides complete isolation of the inverter/switch module 240 from the AC primary and DC backup power sources 280, 285. The selector switch 220 still further induces the circuit breaker 270 within the inverter/switch module 240 to trip, thereby decoupling the inverter/switch module 240 from the DC backup power source 285.

The status indicator circuit 223 is coupled to the selector switch 220 to monitor the operational status of the maintenance bypass switch 210. The status indicator circuit 223 is connected to a status indicator (see description with respect to FIG. 3) to indicate the operational status of the maintenance bypass switch 210 to a user. The alarm circuit 225 is coupled to the selector switch 220 for transmitting a signal to an external alarm 227 when the AC primary and DC backup power sources 280, 285 are disconnected from the load 290. Although not necessary, the alarm circuit 225 allows a warning signal to be given to a user via the external alarm 227. The external alarm 227 may be near or remote from the selector switch 220.

The maintenance bypass switch 220 therefore provides several advantages over the prior art maintenance bypass switches 120. First, there is virtually no transfer and restore procedures to follow. To effectuate the bypass mode of operation, rotate the selector switch 220 to a maintenance bypass position (see description with respect to FIG. 3). To restore normal operation, rotate the selector switch 220 to a normal position (see description with respect to FIG. 3) and close the DC breaker 230. The transfer and restore procedures are uncomplicated and effortless. Second, the bypass mode of operation is mistake proof with virtually no chance of dropping the load 290 during transfer or restore procedures. Finally, the maintenance bypass switch 220 of the present invention is safe. The maintenance bypass switch 220 provides two line switching thereby totally de-energizing the inverter/switch module 240 in the bypass mode of operation; the AC primary power source 280 is, also, connected and disconnected in a single switch.

Figure 3:
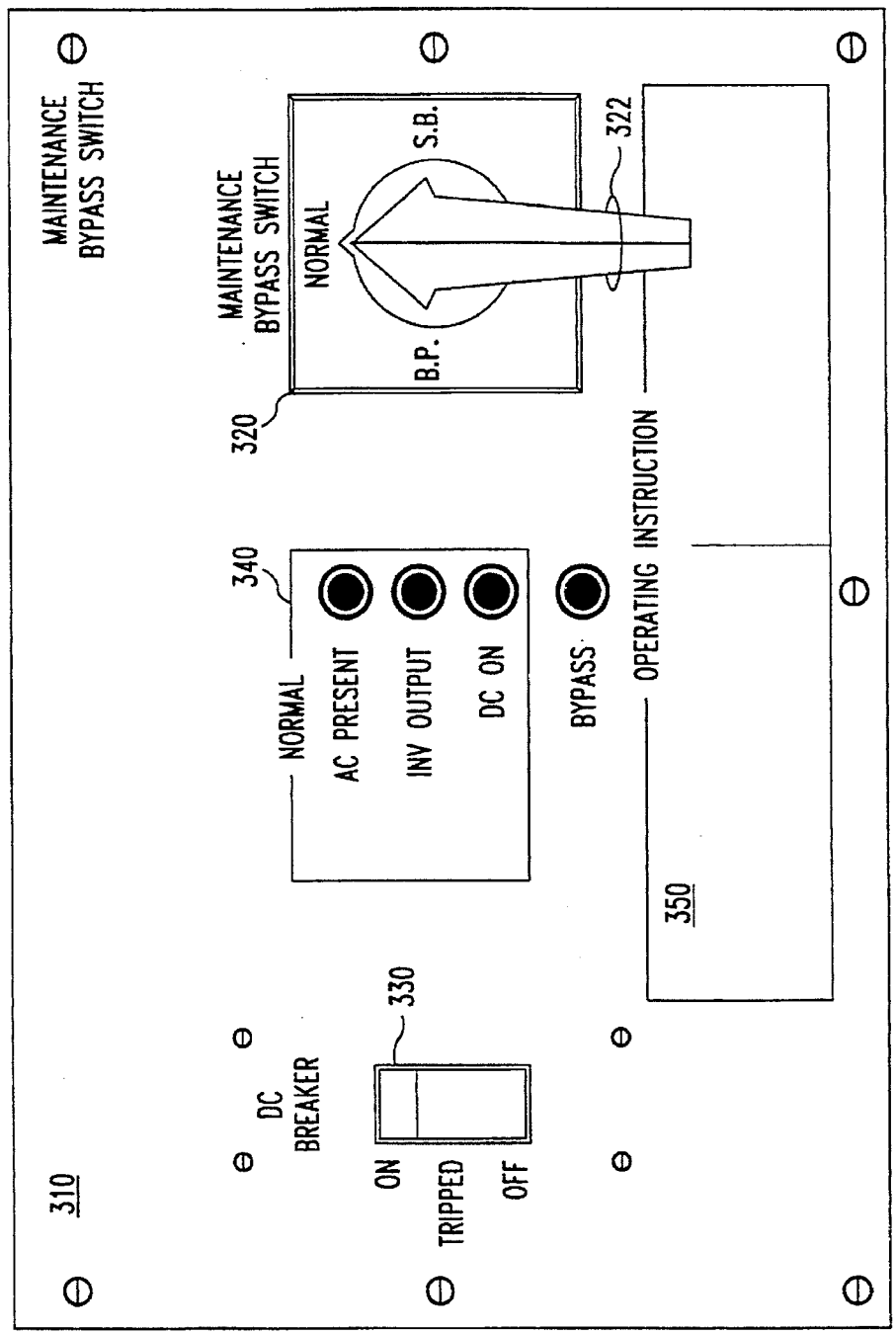
FIG. 3 illustrates a front elevational view of the chassis enclosing the maintenance bypass switch of FIG. 2.

Turning now to FIG. 3, illustrated is a front elevational view of the chassis 300 enclosing the maintenance bypass switch 210 of FIG. 2. The chassis includes a front panel 310 having a selector guide 320 for the selector switch 220, a selector button 330 for the DC breaker 230, a status indicator 340 and an operating instruction field 350. The selector guide 320 includes a directional arm 322 to select one of the operational modes of the maintenance bypass switch 210 including the normal, standby bypass and maintenance bypass modes of operation. The operation of the maintenance bypass switch 210 in each of the operational modes is discussed in more detail with respect to FIG. 2. The selector button 330 provides the mechanism to turn the DC breaker 230 on or off and/or to indicate whether the DC breaker 220 is tripped. The status indicator 340 is coupled to the status indicator circuit 223 to display the operational mode of the maintenance bypass switch 210 to a user. The status indicator 340 may be near (as illustrated in FIG. 3) or remote from the selector switch 220. Finally, the operating instruction field 350 provides an easily accessible location to describe the operating instructions of the maintenance bypass switch 220 to the user.

Figure 4:
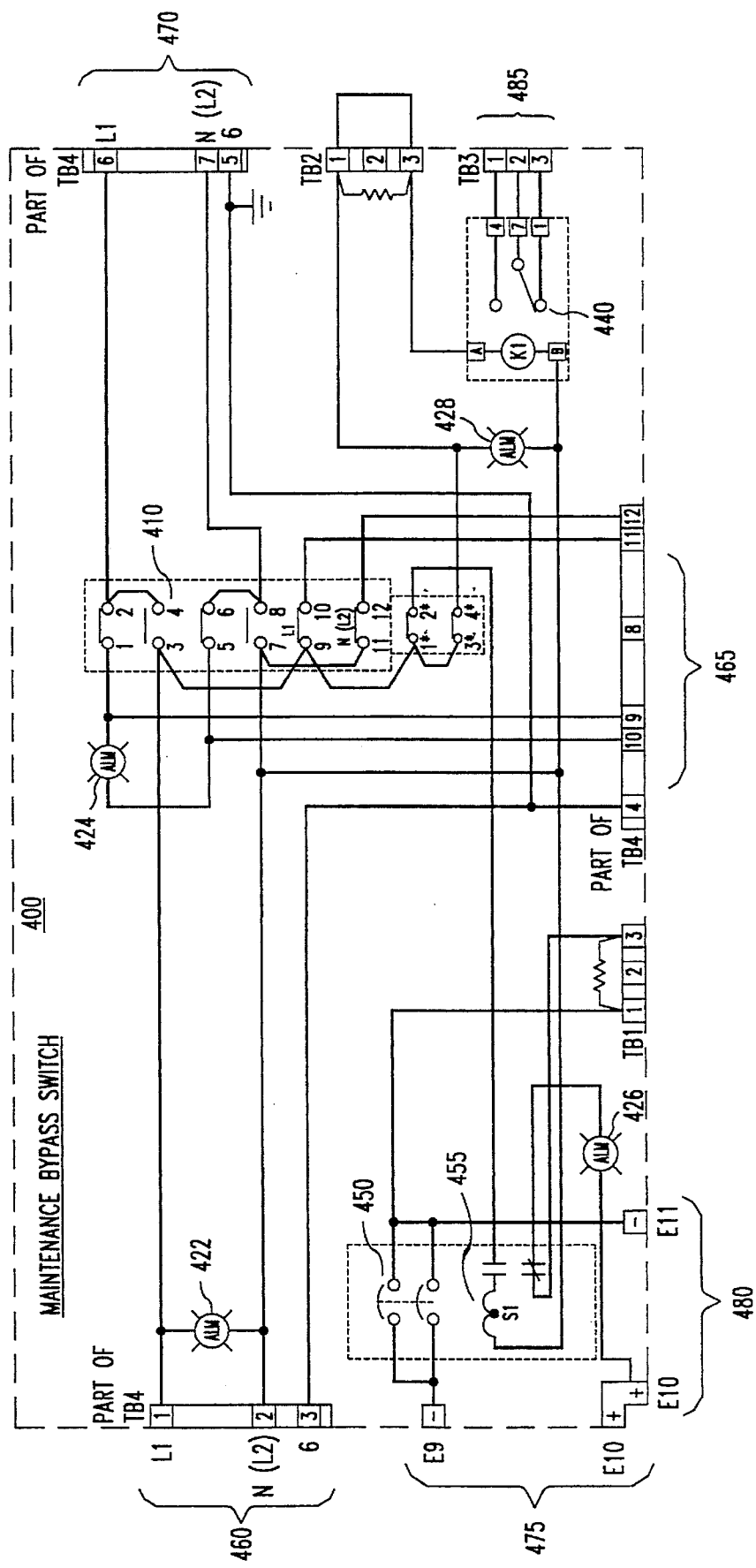
FIG. 4 illustrates a schematic diagram of an alternative embodiment of a maintenance bypass switch according to the principles of the present invention.

Turning now to FIG. 4, illustrated is a schematic diagram of an alternative embodiment of a maintenance bypass switch 400 according to the principles of the present invention. Analogous to the maintenance bypass switch 210 of FIG. 2, the maintenance bypass switch 400 includes a selector switch 410, a status indicator circuit comprising a plurality of individual status circuits 422, 424, 426, 428, an alarm circuit comprising a relay 440 and a double-pole DC breaker 450 having a shunt-tree circuit 455. While the selector switch 410, in the illustrated embodiment, comprises a multi-connection rotary cam switch, alternatively, the selector switch may contain one or more interlocked conventional switches. An AC primary power source (not shown) is connected through the maintenance bypass switch 400, at contacts 460, to an inverter/switch module (not shown), at contacts 465, and a load (not shown), at contacts 470. A DC backup power source (not shown) is also connected through the maintenance bypass switch 400, at contacts 475, to the inverter/switch module, at contacts 480, and, after transformation to AC, to the load, at contacts 470. The individual status circuits 422, 424, 426, 428 provide a signal to a status indicator (not shown) to indicate the operational mode of the maintenance bypass switch 400. The relay 440 is energized when the maintenance bypass switch 400 is in the maintenance bypass mode of operation and a signal may be transmitted through contacts 485 to an external alarm (not shown) to warn a user, if necessary.

The operation of the maintenance bypass switch 400 is analogous to the operation of the maintenance bypass switch 210 as described with respect to FIG. 2. The following table (i.e. Table I) defines the operation of the selector switch 410 in the normal, standby bypass and maintenance bypass modes of operation.

TABLE I

| SELECTOR SWITCH POSITION | CONTACT PAIRS | | | | | | | |
|---|---|---|---|---|---|---|---|---|
| | 1-2 | 3-4 | 5-6 | 7-8 | 9-10 | 11-12 | 1*-2* | 3*-4* |
| NORM | C | O | C | O | C | C | O$_x$ | O |
| SBP | C$_Y$ | O | C | O | C | C | O$_x$ | O |
| MBP | O$_Y$ | C | O | C | O | O | O | C |

In Table I, the subscript $_x$ denotes a momentary closure and the subscript $_y$ denotes a make before break contact.

In the illustrated embodiment, the selector switch 410 demonstrates the normal mode of operation. In the normal mode, contact pairs 1-2, 5-6, 9-10 and 11-12 are closed and contact pairs 3-4, 7-8, 1*-2* and 3*-4* are open. The selector switch 410 therein couples the AC primary power source to the inverter/switch module, the DC backup power source to the inverter/switch module and the inverter/switch module to the load. During the transition from the normal mode to the standby bypass mode, the contact pairs as described with respect to the normal mode of operation remain unchanged except contact pairs 1*-2* are momentarily closed then opened and the DC breaker 450 is tripped (when the AC primary power source is functioning). In the standby bypass mode of operation, the selector switch 410 decouples the inverter/switch module from the DC backup power source. Finally, in the maintenance bypass mode of operation, contact pairs 1-2, 5-6, 9-10, 11-12 and 1*-2* are open and the contact pairs 3-4, 7-8 and 3*-4* are closed. However, during the transition to the maintenance bypass mode of operation, all contact pairs are closed before the aforementioned contact pairs are open. In the maintenance bypass mode, the selector switch 410 decouples the AC primary power source from the inverter/switch module, the DC backup power source from the inverter/switch module and the inverter/switch module to the load.

Although the present invention has been described in detail, those skilled in the art should understand that they can make various changes, substitutions and alterations herein without departing from the spirit and scope of the invention in its broadest form.

What is claimed is:

1. In a backup power system capable of deriving power from alternate AC primary and DC backup power sources to provide continuous AC power to an AC load and including an inverter/switch module having DC and AC inputs and an AC output, a maintenance bypass switch for decoupling said AC primary and DC backup power sources from said backup power system to allow maintenance to be performed thereon, comprising:

a selector switch configured to function in alternate normal, standby bypass and maintenance bypass modes of operation, wherein:

in said normal mode, said selector switch couples said AC primary power source to said AC input of said inverter/switch module, said DC backup power source to said DC input of said inverter/switch module and said AC output of said inverter/switch module to said AC load, in transitioning from said normal mode to said standby bypass mode, said selector switch decouples an inverter in said inverter/switch module from said DC backup power source when said AC primary power source is functioning, in transitioning from said standby bypass mode to said maintenance bypass mode, said selector switch further couples said AC primary power source directly to said AC load, and in said maintenance bypass mode, said selector switch decouples said AC primary power source from said AC input of said inverter/switch module, said DC backup power source from said DC input of said inverter/switch module and said AC output of said inverter/switch module to said AC load, said maintenance bypass switch providing said continuous AC power to said AC load throughout said transitioning.

2. The maintenance bypass switch as recited in claim 1 wherein said selector switch selectively couples and decouples both phase and neutral conductors of said AC primary and DC backup power sources.

3. The maintenance bypass switch as recited in claim 1 further comprising a status indicator coupled to said selector switch for indicating said mode of said selector switch.

4. The maintenance bypass switch as recited in claim 1 further comprising an alarm circuit coupled to said selector switch for transmitting a signal to an external alarm when said AC primary and DC backup power sources are disconnected from said AC load.

5. The maintenance bypass switch as recited in claim 1 wherein said inverter/switch module comprises a static transfer switch.

6. The maintenance bypass switch as recited in claim 1 wherein said selector switch comprises a rotary cam switch.

7. The maintenance bypass switch as recited in claim 1 wherein said selector switch causes an inverter/switch module DC breaker to trip, thereby decoupling said inverter from said DC backup power source.

8. In a backup power system capable of deriving power from alternate AC primary and DC backup power sources to provide continuous AC power to an AC load and including an inverter/switch module having DC and AC inputs and an AC output, a method of decoupling said AC primary and DC backup power sources from said backup power system to allow maintenance to be performed thereon, comprising the steps of:

transitioning a selector switch from a normal mode in which said selector switch couples said AC primary power source to said AC input of said inverter/switch module, said DC backup power source to said DC input of said inverter/switch module and said AC output of said inverter/switch module to said AC load to a standby bypass mode in which said selector switch decouples an inverter in said inverter/switch module from said DC backup power source when said AC primary power source is functioning;

further transitioning said selector switch from said standby bypass mode to a maintenance bypass mode, said selector switch further coupling said AC primary power source directly to said AC load; and causing said selector switch to enter said maintenance bypass mode in which said selector switch decouples said AC primary power source from said AC input of said inverter/switch module, said DC backup power source from said DC input of said inverter/switch module and said AC output of said inverter/switch module to said AC load, said AC power provided continuously to said AC load throughout said transitioning.

9. The method as recited in claim 8 wherein said steps of transitioning, further transitioning and causing each comprise the step of selectively coupling and decoupling both phase and neutral conductors of said AC primary and DC backup power sources.

10. The method as recited in claim 8 further comprising the step of indicating said mode of said selector switch with a status indicator coupled to said selector switch.

11. The method as recited in claim 8 further comprising the step of transmitting a signal to an external alarm when said AC primary and DC backup power sources are disconnected from said AC load.

12. The method as recited in claim 8 wherein said inverter/switch module comprises a static transfer switch, said step of transitioning comprising the step of disabling a normal functioning of said static transfer switch.

13. The method as recited in claim 8 wherein said selector switch comprises a rotary cam switch.

14. The method as recited in claim 8 wherein said step of transitioning comprises the step of causing an inverter/switch module DC breaker to trip, thereby decoupling said inverter from said DC backup power source.

15. In a backup power system capable of deriving power from alternate AC primary and DC backup power sources to provide continuous AC power to an AC load and including an inverter/switch module having DC and AC inputs and an AC output, a maintenance bypass switch having a DC breaker for decoupling both phase and neutral conductors of said AC primary and DC backup power sources from said backup power system to allow maintenance to be performed thereon, comprising:

a rotary cam selector switch configured to function in alternate normal, standby bypass and maintenance bypass modes of operation, wherein:

in said normal mode, said selector switch couples said AC primary power source to said AC input of said inverter/switch module, said DC backup power source to said DC input of said inverter/switch module and said AC output of said inverter/switch module to said AC load, in transitioning from said normal mode to said standby bypass mode, said selector switch causes said DC breaker to trip, decoupling an inverter in said inverter/switch module from said DC backup power source when said AC primary power source is functioning, in transitioning from said standby bypass mode to said maintenance bypass mode, said selector switch further couples said AC primary power source directly to said AC load, and in said maintenance bypass mode, said selector switch decouples said AC primary power source from said AC input of said inverter/switch module, said DC backup power source from said DC input of said inverter/switch module and said AC output of said inverter/switch module to said AC load, said maintenance bypass switch providing said continuous AC power to said AC load throughout said transitioning.

16. The maintenance bypass switch as recited in claim 15 further comprising a status indicator coupled to said selector switch for indicating said mode of said selector switch.

17. The maintenance bypass switch as recited in claim 15 further comprising an alarm circuit coupled to said selector switch for transmitting a signal to an external alarm when said AC primary and DC backup power sources are disconnected from said AC load.

18. The maintenance bypass switch as recited in claim 15 wherein said inverter/switch module comprises a static transfer switch.

19. The maintenance bypass switch as recited in claim 15 wherein said selector switch causes an inverter/switch module DC breaker to trip, thereby decoupling said inverter from said DC backup power source.

20. The maintenance bypass switch as recited in claim 15 wherein, in transitioning said selector switch from said maintenance bypass mode to said normal mode, said DC breaker remains tripped, said DC breaker capable of being reset separately to recouple said inverter to said DC backup power source.

* * * * *